(12) United States Patent
Silverbrook

(10) Patent No.: US 7,140,792 B2
(45) Date of Patent: Nov. 28, 2006

(54) SWIPE DIGITAL PALM COMPUTER WITH BUILT-IN PRINTER

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 10/503,899

(22) PCT Filed: Feb. 12, 2003

(86) PCT No.: PCT/AU03/00162

§ 371 (c)(1),
(2), (4) Date: Aug. 9, 2004

(87) PCT Pub. No.: WO03/069453

PCT Pub. Date: Aug. 21, 2003

(65) Prior Publication Data

US 2005/0117950 A1    Jun. 2, 2005

(30) Foreign Application Priority Data

Feb. 13, 2002  (AU) .......................... PS0494

(51) Int. Cl.
*B41J 3/36*   (2006.01)
*B41J 5/30*   (2006.01)
*B41J 11/44*  (2006.01)

(52) U.S. Cl. .................... 400/88; 400/61; 400/76

(58) Field of Classification Search .................. 400/88, 400/61, 76, 715, 118.1; 347/9, 87, 68, 124; 345/173; 358/296, 473; 101/288
See application file for complete search history.

(56) References Cited

U.S. PATENT DOCUMENTS

| 4,168,533 A | * | 9/1979 | Schwartz ................. 705/403 |
| 4,611,246 A | * | 9/1986 | Nihei ...................... 358/472 |
| 4,899,228 A | * | 2/1990 | Sano et al. .............. 358/473 |

(Continued)

FOREIGN PATENT DOCUMENTS

DE    3314041 A    10/1984

(Continued)

OTHER PUBLICATIONS

Derwent Abstract Accession No. 2001-263703/27, JP 2001057586 A (F & F YG) Feb. 27, 2001.

*Primary Examiner*—Andrew H. Hirshfeld
*Assistant Examiner*—Wasseem H. Hamdan

(57) ABSTRACT

A digital palm PC (10) includes a housing, a storage device to store digital text and/or image data, and a printer located within the housing and receiving digital information from the storage device. The printer built into the palm PC (10) casing is configured to print an image (12) on print media (11) external to the casing as the palm PC (10) traverses the media (11).

12 Claims, 7 Drawing Sheets

U.S. PATENT DOCUMENTS

| | | | |
|---|---|---|---|
| 4,949,283 A * | 8/1990 | Yamauchi et al. | 358/1.14 |
| 5,012,349 A * | 4/1991 | de Fay | 358/296 |
| 5,063,451 A * | 11/1991 | Yanagisawa et al. | 346/143 |
| 5,079,639 A * | 1/1992 | Mochinaga | 358/473 |
| 5,110,226 A * | 5/1992 | Sherman et al. | 400/88 |
| 5,208,446 A * | 5/1993 | Martinez | 235/380 |
| 5,392,447 A * | 2/1995 | Schlack et al. | 715/863 |
| 5,443,320 A * | 8/1995 | Agata et al. | 400/715 |
| 5,501,535 A * | 3/1996 | Hastings et al. | 400/88 |
| 5,578,813 A * | 11/1996 | Allen et al. | 250/208.1 |
| 5,595,445 A * | 1/1997 | Bobry | 400/88 |
| 5,634,730 A * | 6/1997 | Bobry | 400/88 |
| 5,748,511 A * | 5/1998 | Mansutti et al. | 708/109 |
| 5,887,992 A * | 3/1999 | Yamanashi | 400/88 |
| 5,988,900 A * | 11/1999 | Bobry | 400/88 |
| 5,995,243 A * | 11/1999 | Kerschner et al. | 358/461 |
| 6,007,195 A * | 12/1999 | Kokubo | 347/108 |
| 6,015,211 A * | 1/2000 | Kinoshita et al. | 347/109 |
| 6,062,686 A * | 5/2000 | Kinoshita et al. | 347/109 |
| 6,064,496 A * | 5/2000 | Kerschner et al. | 358/471 |
| 6,095,634 A * | 8/2000 | Kishi | 347/35 |
| 6,177,926 B1 * | 1/2001 | Kunert | 345/173 |
| 6,229,565 B1 * | 5/2001 | Bobry | 348/207.99 |
| 6,357,939 B1 | 3/2002 | Baron | 400/88 |
| 6,388,659 B1 * | 5/2002 | Myerson et al. | 345/169 |
| 6,467,688 B1 * | 10/2002 | Goldman et al. | 235/472.01 |
| 6,609,844 B1 * | 8/2003 | Petteruti et al. | 400/88 |
| 6,626,593 B1 * | 9/2003 | Doberenz | 400/88 |
| 6,924,907 B1 * | 8/2005 | Silverbrook et al. | 358/1.8 |
| 2001/0024586 A1 | 9/2001 | Day et al. | 400/88 |
| 2002/0000470 A1 * | 1/2002 | Lanzaro et al. | 235/462.45 |
| 2002/0030716 A1 | 3/2002 | Watanabe et al. | 347/43 |
| 2002/0093570 A1 * | 7/2002 | Silverbrook et al. | 348/207 |
| 2005/0137942 A1 * | 6/2005 | LaFleur | 705/27 |

FOREIGN PATENT DOCUMENTS

| | | | |
|---|---|---|---|
| JP | 410063425 A | * | 3/1998 |
| JP | 2002/273862 A | | 9/2002 |
| WO | WO 2001/41480 A1 | | 6/2001 |

* cited by examiner

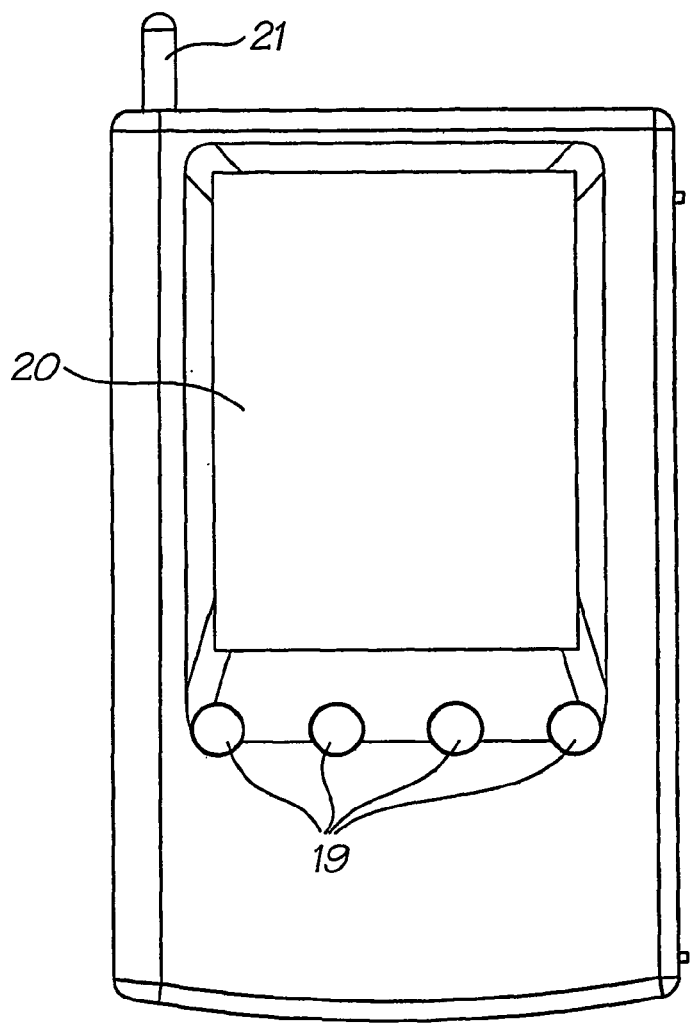 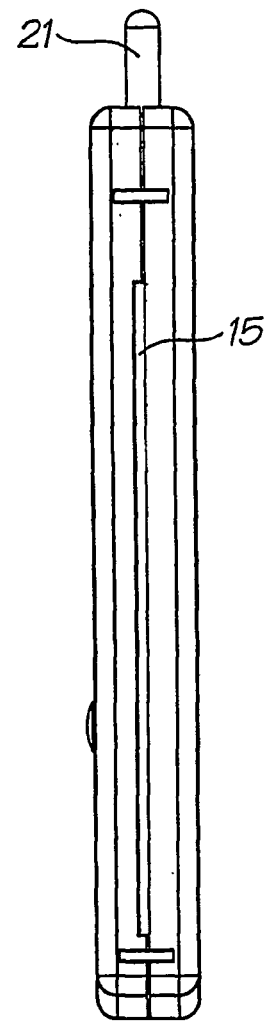
FIG. 6      FIG. 7
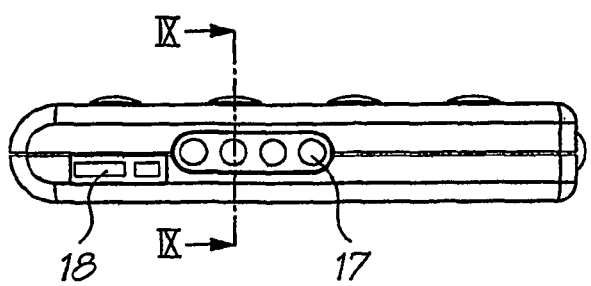
FIG. 8

SWIPE DIGITAL PALM COMPUTER WITH BUILT-IN PRINTER

This Application is a national phase application of PCT/AU03/00162, filed on Feb. 12, 2003, all of which is herein incorporated by reference.

FIELD OF INVENTION

The following invention relates to a hand-held personal computer known as a "palm PC", having a built-in printer.

BACKGROUND TO INVENTION

Known palm PCs have no means of providing an "instant" print-out of text and/or images therefrom Instead, if a print-out is needed, the palm PC must communicate data stored therein to another PC to which there is attached a printer.

The mere incorporation into a palm PC of a known conventional printer device would not result in a compact, easily portable palm PC. This is because prior printers incorporate a supply of print media and employ a print media feed mechanism to transport the print media past the printheads to effect printing onto the print media. Moreover, known printers, having a supply of print media, are large and heavier than would be desirable in a portable palm PC that is sized and shaped to fit conveniently with a user's pocket or purse for example.

CO-PENDING APPLICATIONS

Various methods, systems and apparatus relating to the present invention are disclosed in the following co-pending applications filed by the applicant or assignee of the present invention simultaneously with the present application:

| | | |
|---|---|---|
| PCT/AU03/00154 | PCT/AU03/00151 | PCT/AU03/00150 |
| PCT/AU03/00145 | PCT/AU03/00153 | PCT/AU03/00152 |
| PCT/AU03/00168 | PCT/AU03/00169 | PCT/AU03/00170 |
| PCT/AU03/00162 | PCT/AU03/00146 | PCT/AU03/00159 |
| PCT/AU03/00171 | PCT/AU03/00149 | PCT/AU03/00167 |
| PCT/AU03/00158 | PCT/AU03/00147 | PCT/AU03/00166 |
| PCT/AU03/00164 | PCT/AU03/00163 | PCT/AU03/00165 |
| PCT/AU03/00160 | PCT/AU03/00157 | PCT/AU03/00148 |
| PCT/AU03/00156 | PCT/AU03/00155 | |

The disclosures of these co-pending applications are incorporated herein by cross-reference.

RELATED PATENT APPLICATIONS AND PATENTS

| | | | |
|---|---|---|---|
| US6,227,652 | US6,213,588 | US6,213,589 | US6,231,163 |
| US6,247,795 | US6,394,581 | US6,244,691 | US6,257,704 |
| US6,416,168 | US6,220,694 | US6,257,705 | US6,257,794 |
| US6,234,610 | US6,247,793 | US6,264,306 | US6,241,342 |
| US6,247,792 | US6,264,307 | US6,254,220 | US6,234,611 |
| US6,302,528 | US6,283,582 | US6,239,821 | US6,338,547 |
| US6,247,796 | US09/113,122 | US6,390,603 | US6,362,843 |
| US6,293,653 | US6,312,107 | US6,227,653 | US6,234,609 |
| US6,238,040 | US6,188,415 | US6,227,654 | US6,209,989 |
| US6,247,791 | US6,336,710 | US6,217,153 | US6,416,167 |
| US6,243,113 | US6,283,581 | US6,247,790 | US6,260,953 |
| US6,267,469 | US6,273,544 | US6,309,048 | US6,420,196 |
| US6,443,558 | US09/422,892 | US6,378,989 | US09/425,420 |
| US09/422,893 | US09/609,140 | US6,409,323 | US6,281,912 |
| US09/575,113 | US6,318,920 | US6,488,422 | US09/693,644 |
| US6,457,810 | US6,485,135 | US09/112,763 | US6,331,946 |
| US6,246,970 | US6,442,525 | US09/505,951 | US09/505,147 |
| US09/505,952 | US09/575,108 | US09/575,109 | US09/575,110 |
| US09/607,985 | US6,398,332 | US6,394,573 | US09/606,999 |
| US6,238,044 | US6,425,661 | US6,390,605 | US6,322,195 |
| US09/504,221 | US6,480,089 | US6,460,778 | US6,305,788 |
| US6,426,014 | US6,364,453 | US6,457,795 | US09/556,219 |
| US09/556,218 | US6,315,399 | US6,338,548 | US09/575,190 |
| US6,328,431 | US6,328,425 | US09/575,127 | US6,383,833 |
| US6,464,332 | US6,390,591 | US09/575,152 | US6,328,417 |
| US6,322,194 | US09/575,177 | US09/575,175 | US6,417,757 |
| US09/608,780 | US6,428,139 | US09/607,498 | US09/693,079 |
| US09/693,135 | US6,428,142 | US09/692,813 | US09/693,319 |
| US09/693,311 | US6,439,908 | US09/693,735 | PCT/AU98/00550 |
| PCT/AU00/00516 | PCT/AU00/00517 | PCT/AU00/00511 | PCT/AU00/00754 |
| PCT/AU00/00755 | PCT/AU00/00756 | PCT/AU00/00757 | PCT/AU00/00095 |
| PCT/AU00/00172 | PCT/AU00/00338 | PCT/AU00/00339 | PCT/AU00/00340 |
| PCT/AU00/00341 | PCT/AU00/00581 | PCT/AU00/00580 | PCT/AU00/00582 |
| PCT/AU00/00587 | PCT/AU00/00588 | PCT/AU00/00589 | PCT/AU00/00583 |
| PCT/AU00/00593 | PCT/AU00/00590 | PCT/AU00/00591 | PCT/AU00/00592 |
| PCT/AU00/00584 | PCT/AU00/00585 | PCT/AU00/00586 | PCT/AU00/00749 |
| PCT/AU00/00750 | PCT/AU00/00751 | PCT/AU00/00752 | PCT/AU01/01332 |
| PCT/AU01/01318 | PCT/AU00/01513 | PCT/AU00/01514 | PCT/AU00/01515 |
| PCT/AU00/01516 | PCT/AU00/01517 | PCT/AU00/01512 | PCT/AU01/00502 |
| PCT/AU02/01120 | PCT/AU00/00333 | PCT/AU01/00141 | PCT/AU01/00139 |
| PCT/AU01/00140 | PCT/AU00/00753 | PCT/AU01/01321 | PCT/AU01/01322 |
| PCT/AU01/01323 | PCT/AU00/00594 | PCT/AU00/00595 | PCT/AU00/00596 |
| PCT/AU00/00597 | PCT/AU00/00598 | PCT/AU00/00741 | PCT/AU00/00742 |

SUMMARY OF THE INVENTION

In accordance with the invention, there is provided a digital palm PC comprising:
  a housing;
  a digital storage device to store digitally text and/or image data; and
  a printer located within the housing and receiving digital information from the digital storage device, the printer being configured to print an image on media external thereto as the palm PC traverses the media in a printing orientation.

Preferably, the palm PC further includes a movement sensor configured to measure the relative movement of the palm PC as it traverses the media in the printing orientation. More preferably, the movement sensor includes a wheel configured to engage the media as the palm PC traverses the media in the printing orientation, In one embodiment, the wheel is an optical encoder wheel including a series of circumferential markings, the movement sensor further including an optical sensor for detecting relative movement of the markings as the wheel rotates in engagement with the media.

Alternatively, the movement sensor forms part of an optical tracking system for tracking relative movement of the palm PC as it traverses the media in the printing orientation. In one form, the optical tracking system includes pattern recognition means for recognising relative movement of the palm PC with respect to the media. The optical tracking system can be configured to recognise a predetermined pattern on the media, and to recognise the relative movement of the palm PC with respect to the media by determining relative movement of the palm PC with respect to the predetermined pattern Preferably, the housing also includes a print controller including a processor into which image data can be input and converted into a sequence of drop ejection control signals. The print controller operates said ink ejection nozzles in accordance with said drop ejection control signals to cause printing on said print media at a rate determined by fit measured relative movement of palm PC with respect to the media.

Preferably, the printer includes a drop-on-demand color inkjet printhead.

In a preferred form, the palm PC further includes an ink reservoir in fluid communication with the printhead for providing ink thereto. Preferably, the ink reservoir includes at least one ink inlet via which the ink reservoir can be recharged with ink.

BRIEF DESCRIPTION OF THE DRAWINGS

A preferred embodiment of the invention will now be described, by way of example only, with reference to the accompanying drawings, in which:

FIG. 6 is a front elevational view of the palm PC;

FIG. 7 is a side elevational view of the palm PC;

FIG. 8 is an end elevational view of the palm PC; and

DESCRIPTION OF THE PREFERRED EMBODIMENT

Figure 1:
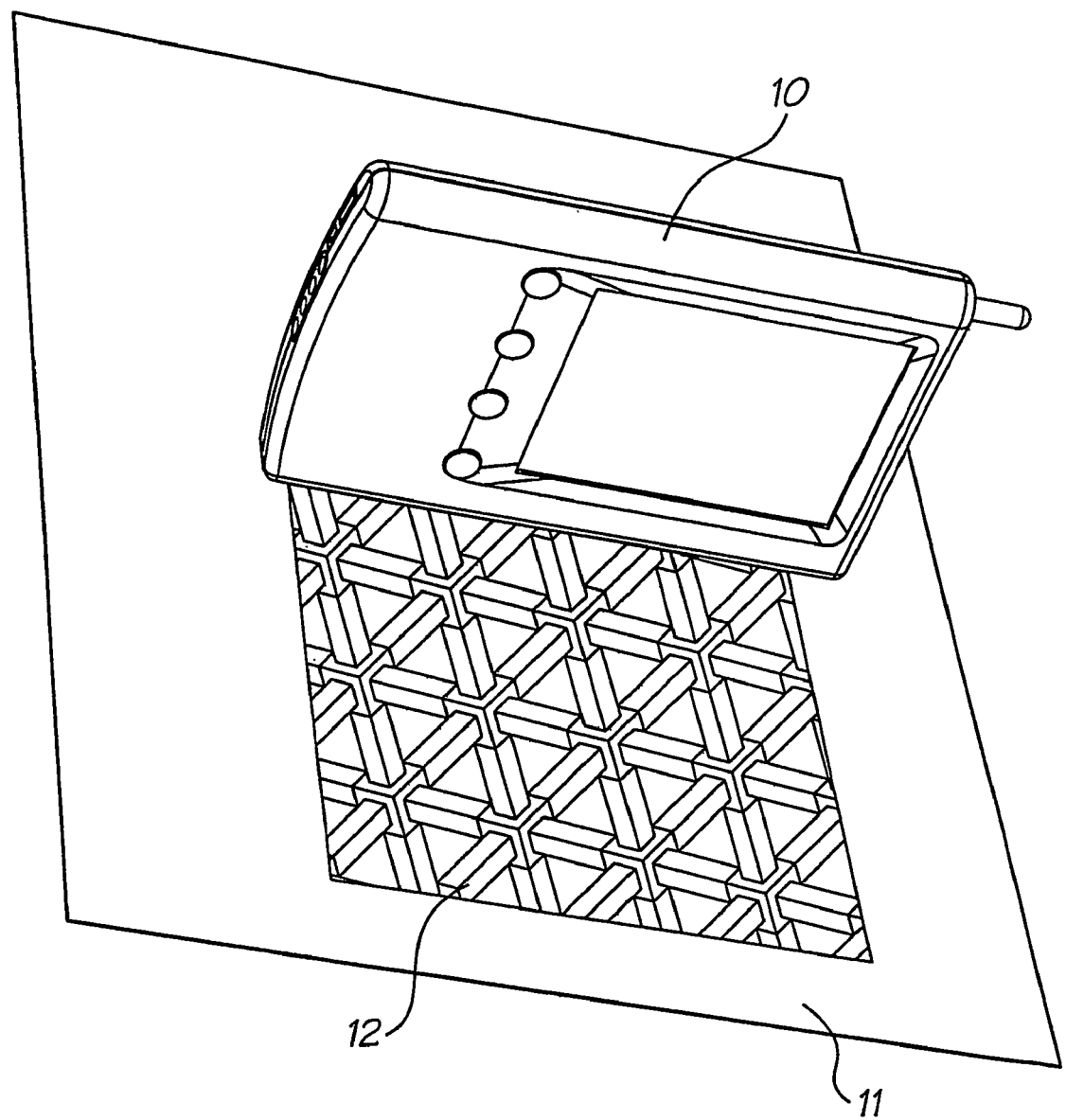
FIG. 1 is a schematic perspective illustration of a palm PC having a built-in printer in use, printing an image on a page.

In FIG. 1 of the accompanying drawings there is schematically depicted a palm PC 10 having an integral printer. The palm PC is sized and shaped to fit within a typical purse or pocket user and is shown in the figure traversing a page of print media 11 to print an image 12 thereon.

Figure 2:
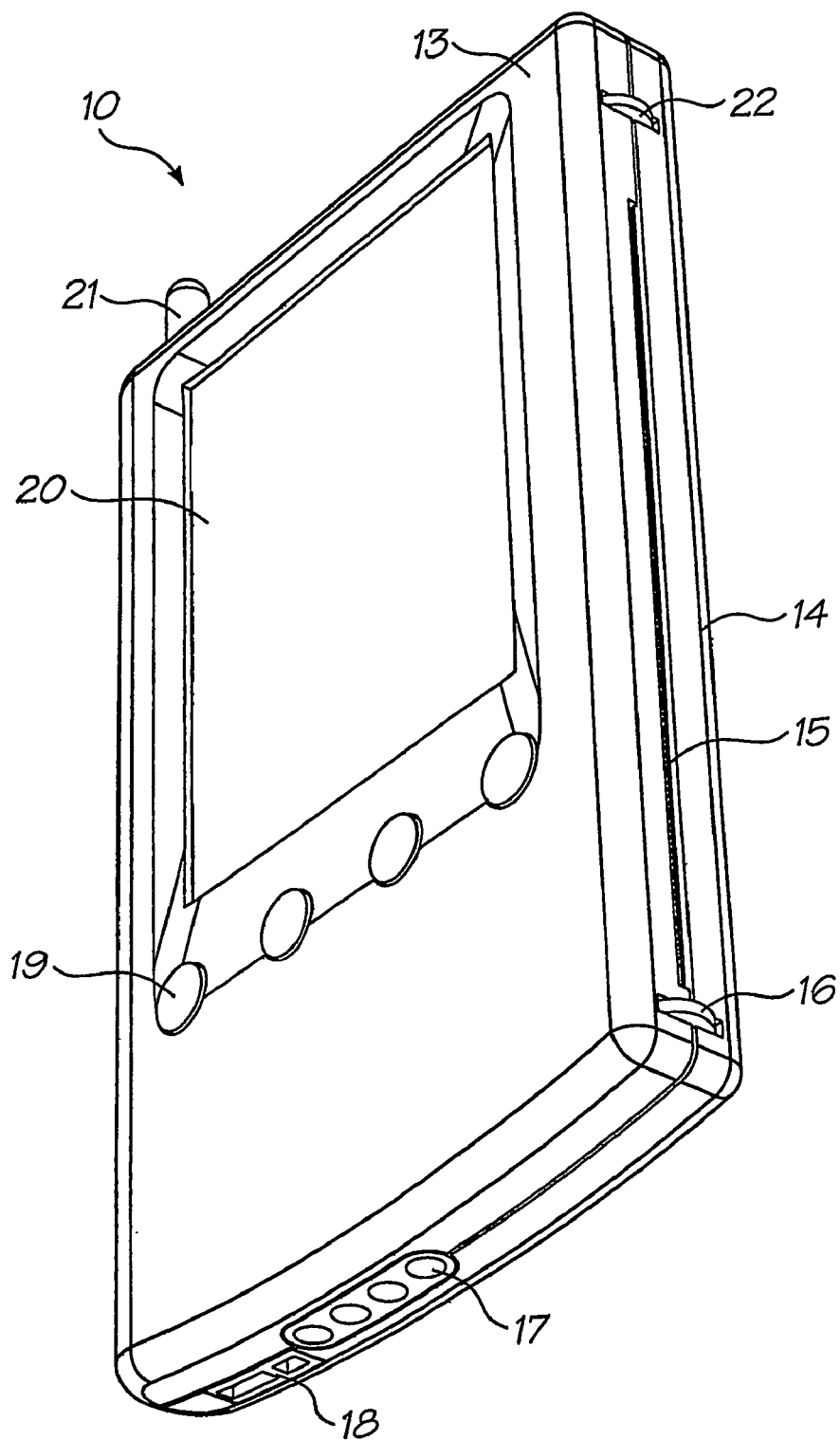
FIG. 2 is perspective illustration of a palm PC shown from above.

As shown in FIG. 2, the palm PC includes a housing having a top molding 13 and a base molding 14. These moldings house the internal components of the device. The palm PC includes a color liquid crystal display (LCD) and touch screen 20. A stylus 21 fits within a receptacle in the palm PC and is used to touch the LCD and touch screen 20 to operate the device. Function buttons 19 also serve to control the functioning of the palm PC.

At the bottom edge of the palm PC 10 there is provided a printhead 15 flanked at either end by wheels 16 and 22. Wheel 16 is an optical encoder wheel, whereas wheel 22 is an idler wheel. These wheels may be connected so as to rotate in unison upon a common shaft. The operation of optical encoder wheel 16, idler wheel 22 and printhead 15 is described in detail our co-pending application (AP46) entitled "Portable Printer and Copier", the content of which is specifically incorporated herein by cross-reference.

The printhead 15 can be capped and uncapped selectively by a capping device (not shown), which is described in our co-pending application (AP44) entitled "Capping Device for a Portable Printer", the content of which is specifically incorporated herein by cross-reference. As an alternative to a capping device, an ink seal 36 may be provided. This might be in the form of a removable strip of elastomeric material.

Figure 3:
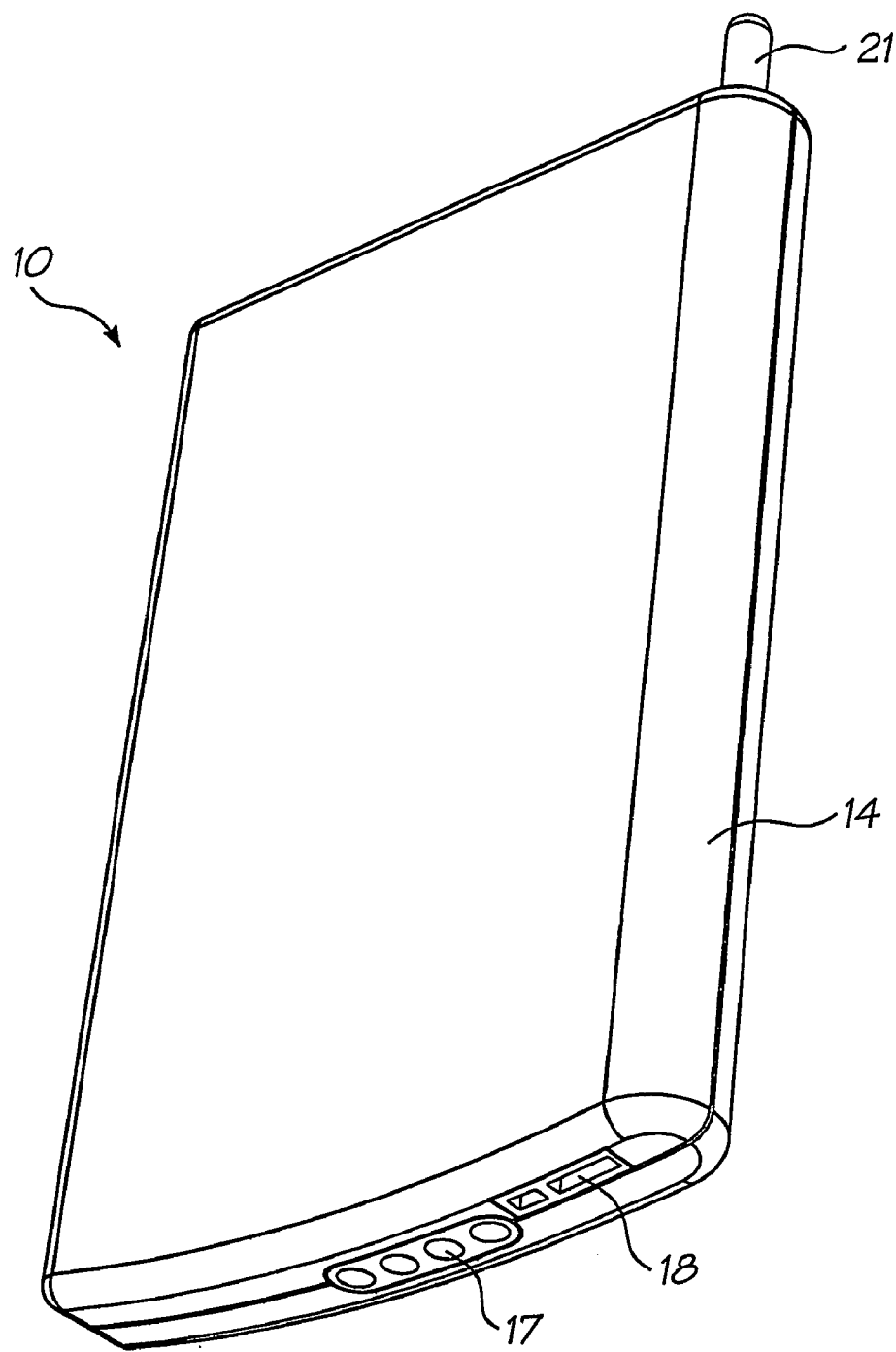
FIG. 3 is a schematic perspective illustration of a palm PC shown from below.

As shown in FIG. 3, the palm PC 10 includes ink inlets 17 via which an internal ink reservoir having separate compartments can be refilled with ink. A battery charger and communications port module 18 are located, in this embodiment, on the same side of the palm PC as the ink inlets 17.

Figure 4:
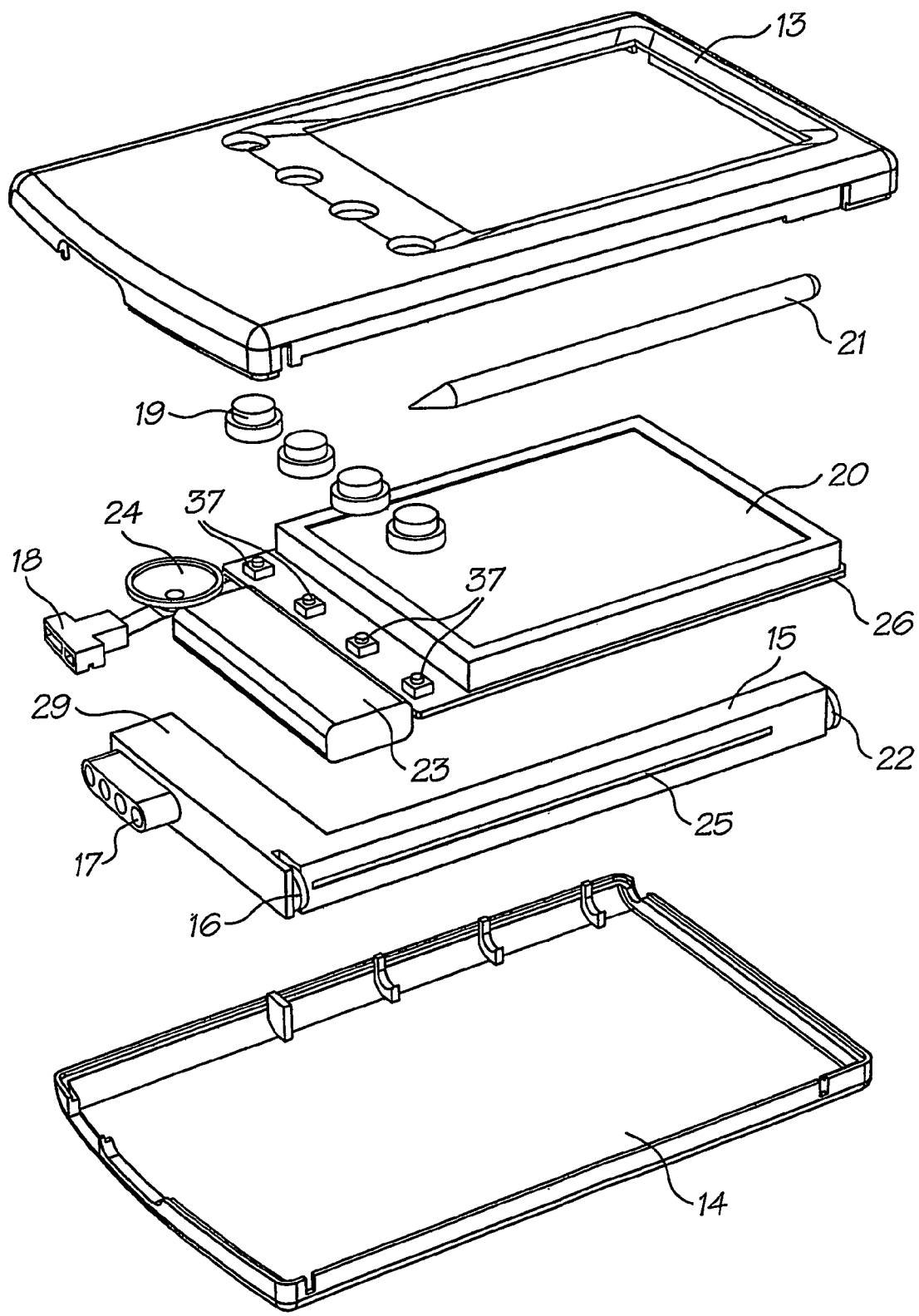
FIG. 4 is a schematic parts-exploded perspective view of the palm PC.
Figure 9:
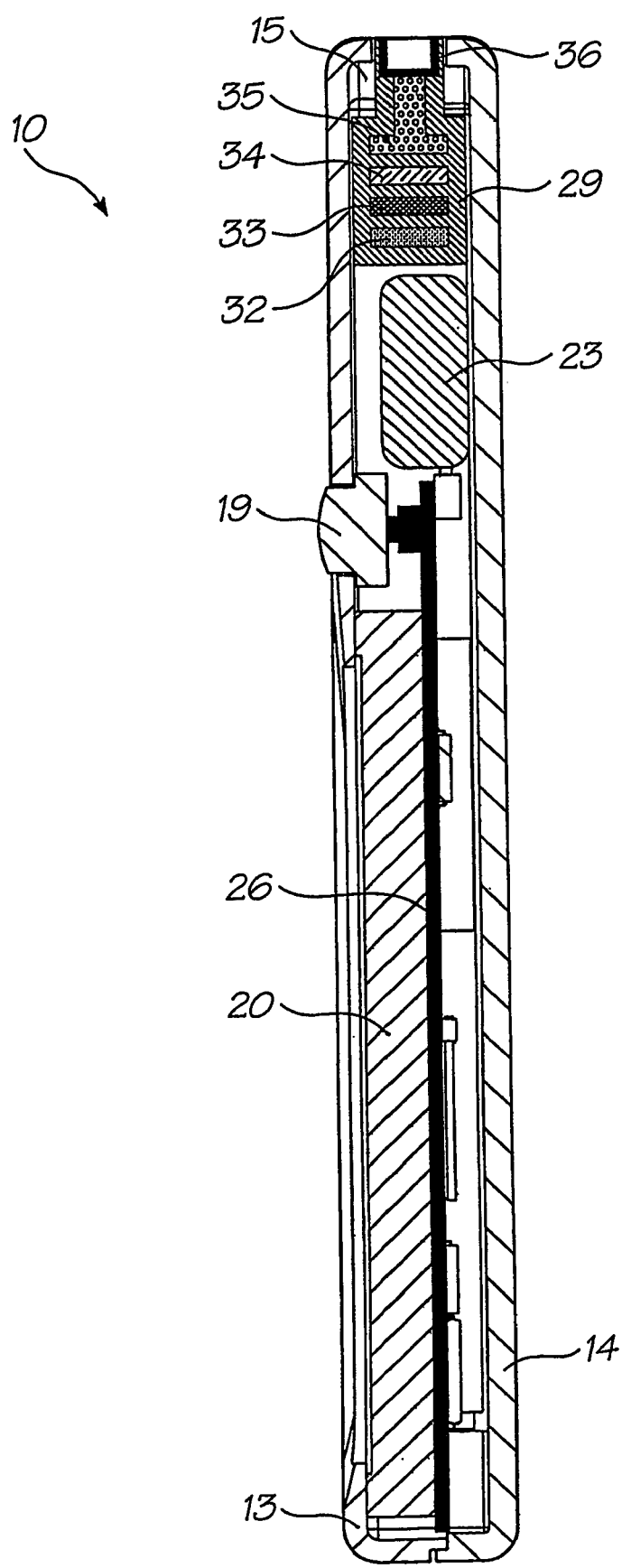
FIG. 9 is a schematic cross-sectional elevational view of the palm PC taken at IX—IX in FIG. 8.

As shown in the exploded perspective illustration of FIG. 4, the LCD and touch screen 20 sits upon a printed circuit board 26. A number of function switches 37 are mounted on the PCB 26 and aligned with function buttons 19 so as to be depressed when the buttons 19 are used. A battery 23 which is preferably a lithium-ion rechargeable battery resides alongside the PCB and is connected electrically to the charger port module 18 and the PCB 26. A speaker 24 is also provided. The ink inlets communicate with respective compartments within reservoir 29. These compartments are best illustrated in FIG. 9. The individual ink compartments relay ink to the printhead unit 15.

Figure 5:
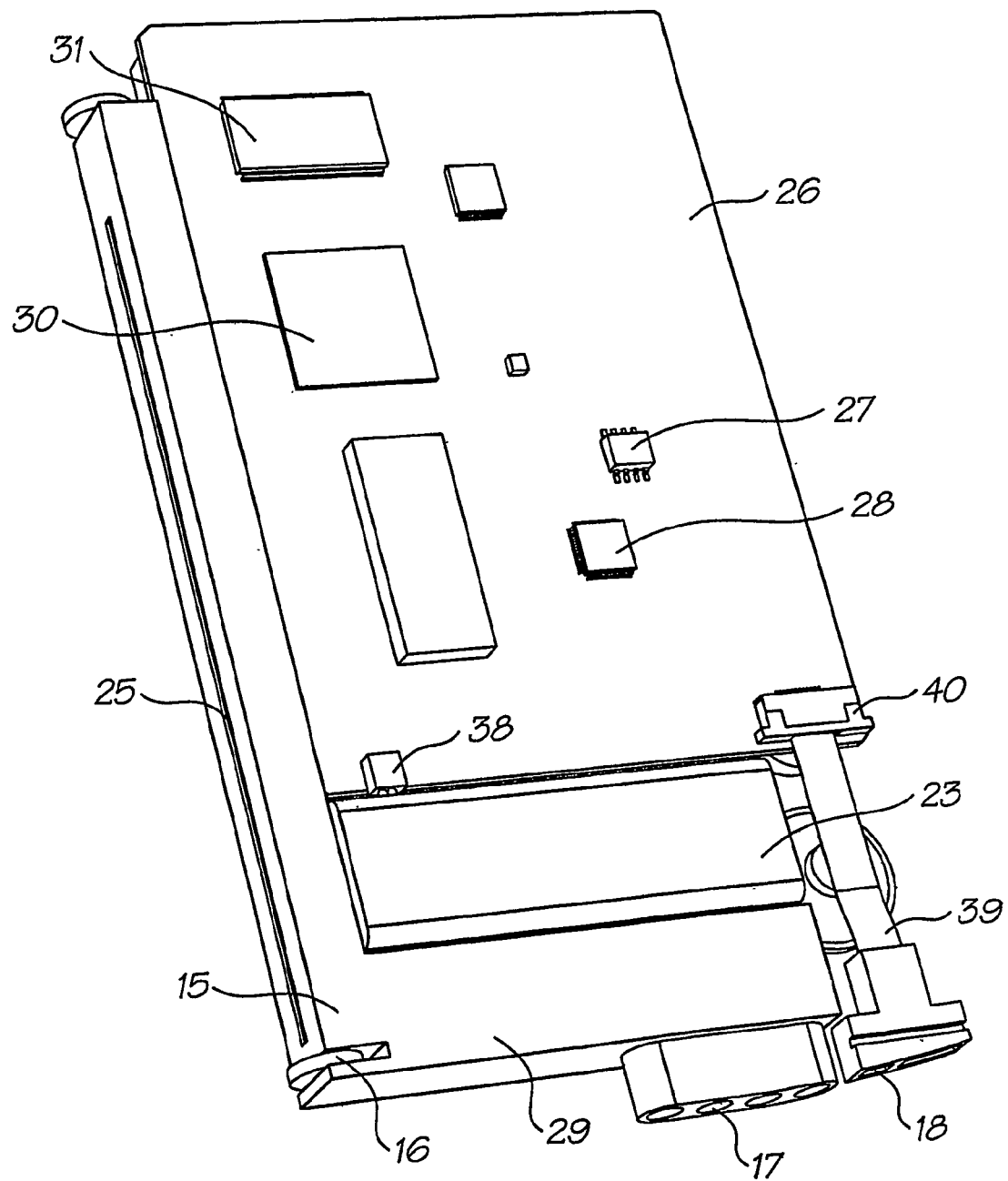
FIG. 5 is a schematic perspective illustration of the major internal components of the palm PC.

As depicted in FIG. 5, the PCB 26 has attached thereto a dynamic random access memory (DRAM) chip 31, a print engine controller (PEC) chip 30, a QA chip 27 and a flash memory chip 28. The battery 23 connects to the PCB at connector block 38 and a ribbon cable for flexible PCB 39 connects the power and communications port module 18 to the PCB 26 via a connector block 40.

As shown in FIG. 9, the ink reservoir 29 is divided into a number of longitudinal compartments. In the depicted embodiment, there are separate compartments for cyan ink 32, magenta ink 33, black ink 34 and yellow ink 35. Ink from these compartments is transferred to printhead 15.

Power and data transfer from the PCB 26 to the printhead 15 can be by direct connection between those two units. That is, the printhead 15 may have electrical contacts soldered directly onto the PCB 26. However, in alternate configurations, an intermediate flexible PCB extending between the printhead 15 and PCB 26 can be used.

In use, the palm PC 10 can be operated by use of the stylus 21 upon the color LCD and touch screen 20.

Function buttons 19 can also be manipulated as required. When a printed image of text and/or graphics is desired, a print command can be initiated either by use of a stylus 21 or function buttons 19. A user then draws the printhead 15 over a sheet of print media (in this case paper) as shown in FIG. 1. The ejection of ink by printhead 15 upon print media 11 is controlled by the PEC chip 30 in response to signals received from the optical encoder wheel 16 which contacts the surface of the print media 11 and rotates in use. Details of this interaction can be found in our co-pending application AP46 as cross-referenced above.

The internal configuration of components within the housing of the palm PC can vary depending upon requirements. For example, the printhead and ink cartridge can be an integral unit or formed separately. The printhead can extend generally normal to the extent of the ink cartridge or parallel thereto. In a further embodiment, instead of providing only two wheels 16 and 22 (one optical encoder wheel and one idler wheel) on a narrow edge of the palm PC, three, four, or more wheels might be provided say in the broad back face of base molding 14. In the case of four wheels being provided, they can be disposed in a rectangular layout in plan. One of the wheels would be an optical encoder wheel and the other wheels idler wheels. The printhead can be located generally within a space defined by a rectangle with a wheel at each corner.

Although the invention has been described with reference to a number of specific embodiments, it will be appreciated by those skilled in the art that the invention can be embodied in many other forms.

I claim:

1. A digital palm PC comprising:
   a housing;
   an optical encoder wheel having a plurality of markings disposed circumferentially thereon and an idler wheel, each of said wheels protruding from said housing and having a common shaft, said wheels being configured for traversing the housing over print media external to said housing;
   an optical sensor for sensing the markings as the optical encoder wheel is rotated in contact with the media;
   a digital storage device to store digitally text and/or image data; and
   a printer located within the housing and receiving digital information from the digital storage device, the printer being configured to print an image on said media as the palm PC traverses the media in a printing orientation.

2. The palm PC of claim 1, wherein the optical sensor forms part of an optical tracking system for tracking relative movement of the palm PC as it traverses the media in the printing orientation.

3. The palm PC of claim 2, wherein the optical tracking system includes pattern recognition means for recognising relative movement of the palm PC with respect to the media.

4. The palm PC of claim 2, wherein the optical tracking system is configured to recognise a predetermined pattern on the media, and to recognise the relative movement of the palm PC with respect to the media by determining relative movement of the palm PC with respect to the predetermined pattern.

5. The palm PC of any claim 1, wherein the housing also includes a print controller including a processor into which image data can be input and converted into a sequence of drop ejection control signals, said print controller operating said ink ejection nozzles in accordance with said drop ejection control signals to cause printing on said print media at a rate determined by the measured relative movement of palm PC with respect to the media.

6. The palm PC of claim 1, wherein the printer includes a drop-on-demand color inkjet printhead.

7. The palm PC of claim 1, further including an ink reservoir in fluid communication with said printhead for providing ink thereto.

8. The palm PC of claim 7, wherein said ink reservoir includes at least one ink inlet via which the ink reservoir can be recharged with ink.

9. The palm PC of claim 1, further including a rechargeable battery.

10. The palm PC of claim 9, wherein the battery powers the printer and a processor of the palm PC.

11. The palm PC of claim 9, including a power port for recharging said battery.

12. The palm PC of claim 1, further including a communications port for receiving data.

* * * * *